Dec. 4, 1956  R. W. McCLENNY  2,772,798
AUTOMATIC DUMP MECHANISM FOR A SCOOP
Filed Dec. 15, 1953  2 Sheets-Sheet 1

INVENTOR.
ROBERT W. McCLENNY,
BY
McMorrow, Berman + Davidson
ATTORNEYS

Dec. 4, 1956  R. W. McCLENNY  2,772,798
AUTOMATIC DUMP MECHANISM FOR A SCOOP
Filed Dec. 15, 1953.  2 Sheets—Sheet 2
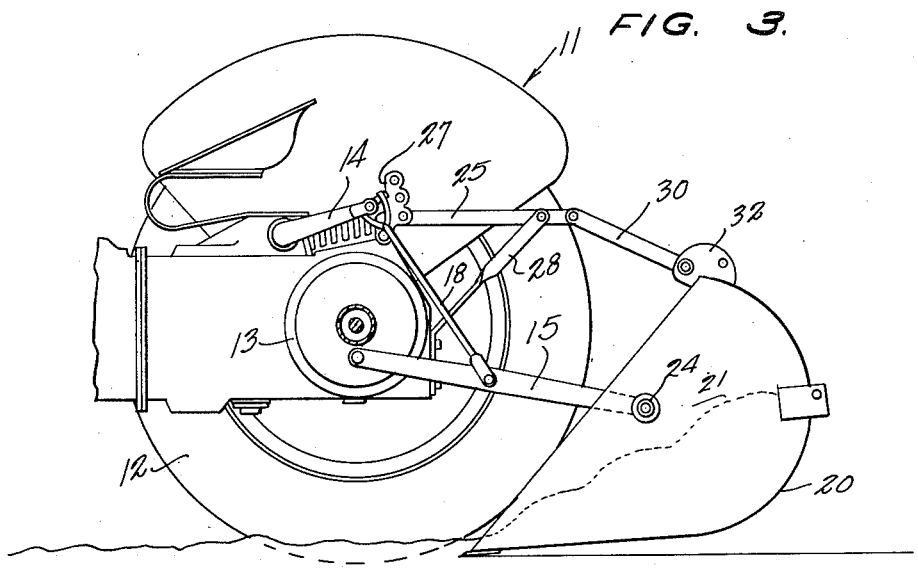
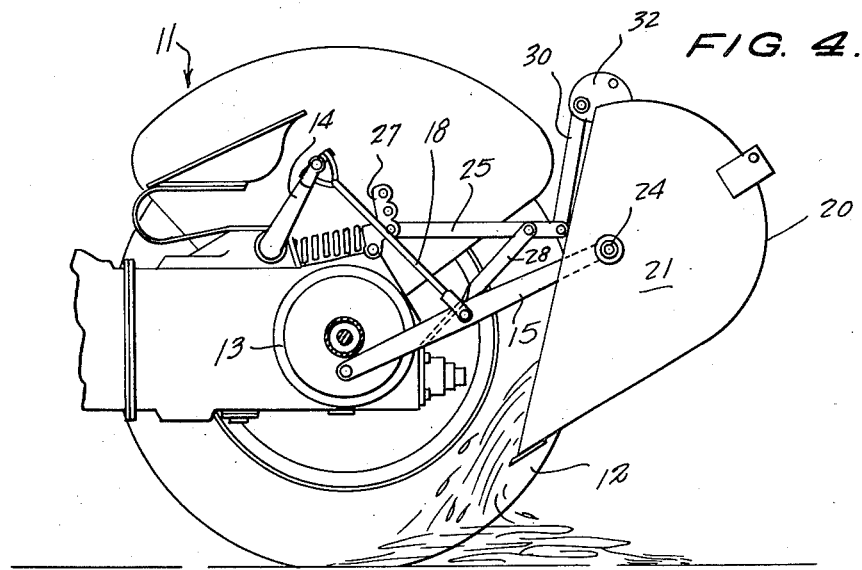
INVENTOR.
ROBERT W. McCLENNY,
BY
McMorrow, Berman + Davidson
ATTORNEYS.

United States Patent Office 2,772,798
Patented Dec. 4, 1956

2,772,798

AUTOMATIC DUMP MECHANISM FOR A SCOOP

Robert W. McClenny, Suffolk, Va.

Application December 15, 1953, Serial No. 398,306

2 Claims. (Cl. 214—140)

This invention relates to agricultural implements, and more particularly to an improved scoop and dump mechanism therefor adapted to be attached to te rear end of a tractor.

The main object of the invention is to provide a novel and improved dumping scoop attachment for a tractor, said attachment being simple in construction, being easy to mount on the tractor, and being reliable in operation.

A further object of the invention is to provide an improved dump scoop attachment for the rear end of a tractor, said attachment being provided with improved means for elevating the scoop and rotating the scoop to desired positions, the structure involving inexpensive components, being durable, being relatively light in weight, and being operated by the lift mechanism of the tractor.

Further objects and advantages of the invention will become apparent from the following description and claims, and from the accompanying drawings, wherein:

Figure 3 is a side elevational view of the structure of Figure 1, showing the scoop in lowered, ground-engaging position.

Figure 4 is a side elevational view of the structure of Figure 1, showing the scoop in elevated, dumping position.

Figure 1:
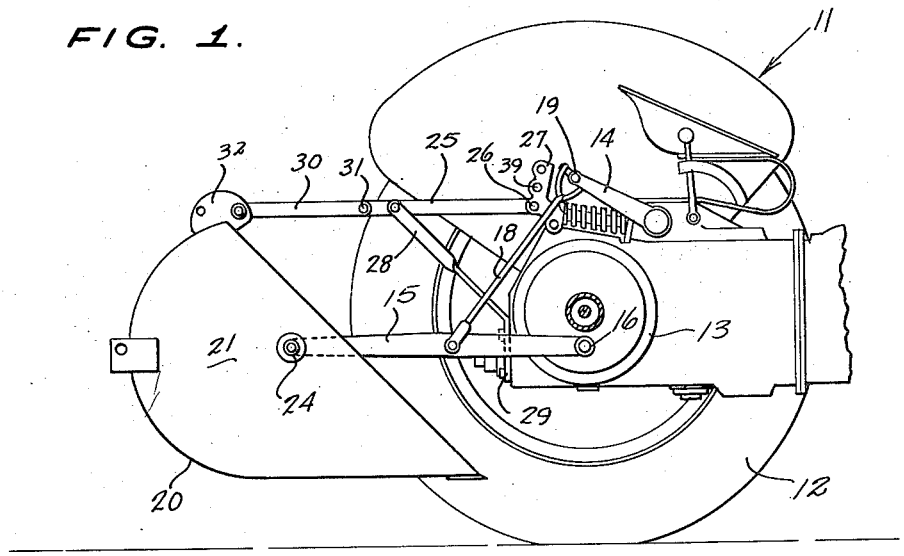
Figure 1 is a side elevational view of the rear portion of a tractor showing an improved dump scoop structure according to the present invention operatively connected to the tractor rear portion.

Referring to the drawings, Figure 1 illustrates the rear portion of a conventional tractor, one of the rear wheels 12 of the tractor 11 being removed so that the improved dump scoop apparatus of the present invention may be more clearly illustrated. As shown, the tractor 11 has the rear axle housing 13 and is provided with the lift arms 14, 14 which are operated by the lift mechanism of the tractor and which are arranged for selective operation from the position thereof shown in Figures 1 and 2, as for example, to the lowered position shown in Figure 3, or to the raised positions shown in Figure 4. It will be understood that the mechanism for operating the lift arms 14 forms part of a conventional tractor structure and is no part of the present invention.

Designated at 15, 15 are a pair of relatively long, rearwardly extending supported arms pivoted at 16 to respective sides of the large central portion 17 of the axle housing 13, the intermediate portions of the arms 15 being connected by respective link bars 18, 18 to the ends of the lift arms 14, 14 suitable pivot joints 19, 19 being provided at the connections between the link rods 18 and lift arms 14.

Designated at 20 is a scoop member having the side walls 21, 21, the rear wall 22 and the bottom wall 23. The ends of the supporting arms 15 are pivotally connected to the respective side walls 21, 21 by pivot bolts 24, 24, so that the scoop member is rotatable around a transverse horizontal axis located adjacent the intermediate portions of the top edges of side walls 21, 21, as is clearly shown in Figure 1.

Designated at 25 is an arm which is secured at one end thereof, as shown at 26, to a bracket member 27 secured to the rear portion of the tractor frame, the arm 25 being supported at its intermediate portion by respective downwardly and forwardly inclined strut bars 28, 28 which are rigidly secured at 29 to the lower rear surface of the tractor frame a substantial distance below the bracket 27. The bracket 27 is provided with apertures 39 for selectively bolting the rear ends of the bar 25 thereto so that said bar may be arranged in a substantially horizontal position, as shown in Figure 1.

Figure 2:
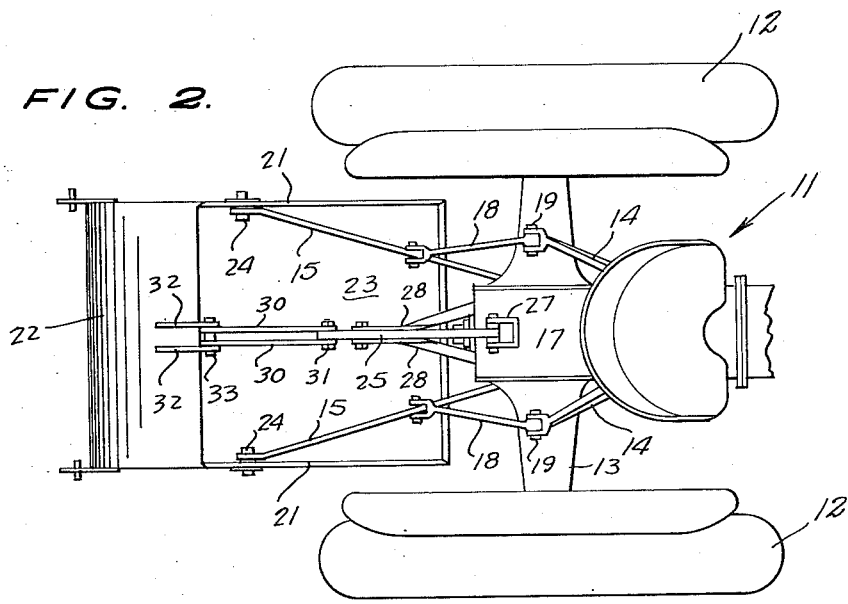
Figure 2 is a top plan view of the structure shown in Figure 1.

The rear end of the bar 25 is connected to the intermediate portion of the top edge of rear wall 22 by a pair of relatively short, parallel link bars 30, 30, said link bars being pivotally connected to the ends of bar 25 on opposite sides of said bar 25 by a pivot bolt 31, as shown in Figure 2, the rear ends of the link bars 30, 30 being seated between a pair of vertical lug members 32, 32 rigidly secured to the intermediate portion of the top margin of rear wall 22, the arms 30, 30 being pivotally connected to the lugs 32, 32 by transverse pivot pin 33.

Figure 1 illustrates the normal position of the scoop 20, wherein the supporting arms 15 and the relatively short link bars 30 are substantially in horizontal positions and wherein the bottom wall 23 of the scoop is likewise in a substantially horizontal position, elevated above the ground. By operating the mechanism associated with the link arms 14, 14, said arms may be lowered to the position shown in Figure 3, wherein the arms 15 and 30 are similarly lowered, allowing the scoop 20 to assume a position wherein the bottom wall 23 of the scoop is inclined downwardly and forwardly at a relatively small angle to the horizontal and in engagement with the ground. With the parts arranged as shown in Figure 3, the scoop 20 will pick up loose soil or other material on the ground as the tractor is moved forwardly. When the scoop has become loaded to the desired degree, the mechanism associated with the lift arms 14 may be operated to elevate the scoop to the position shown in Figure 1, wherein the bottom wall 23 of the scoop is substantially horizontal, and the scoop is elevated above the ground. The scoop may be transported by the tractor with its load to the desired location at which the load is to be discharged, and when the said desired location is reached, the mechanism associated with the lift arm 14 may be operated to elevate said lift arms to the position thereof shown in Figure 4, wherein the relatively long supporting arms 15 are elevated and the relatively short link arms 30 are elevated to a substantially greater degree, as shown in Figure 4, causing the scoop to be rotated to its dumping position, wherein the bottom wall 23 is tilted downwardly and forwardly at a relatively steep angle, causing the contents of the scoop to be discharged by gravity onto the ground behind the tractor. After the load has been thus discharged, the scoop may be lowered to its normal position, shown in Figure 1, and may be returned for a repetition of the above described operation.

While a specific embodiment of an improved tractor-mounted dump scoop structure has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In combination, a tractor having lift arms and means for elevating and depressing said lift arms, a pair of supporting arms having forward ends pivoted to the tractor and rearward ends, a scoop having side walls, a bottom wall, and a rear wall having an upper end, means pivoting the rearward ends of the support arms to said side walls, links extending between and pivoted to said lift arms and intermediate portions of the supporting arms, bracket means fixed on the tractor at a level above said supporting arms, link means comprising a forward link having a forward end connected to said bracket means and a rearward end, a rigid strut fixed on the tractor beneath said bracket means, said strut having an upper end connected to said forward link at a point intermediate the ends of said forward link, said link means further comprising a rearward link having a forward end pivoted to the rearward end of the forward link and a rearward end pivoted to the scoop rear wall at a point adjacent to the upper end of the rear wall.

2. In combination, a tractor having lift arms and means for elevating and depressing said lift arms, a pair of supporting arms having forward ends pivoted to the tractor and rearward ends, a scoop having side walls, a bottom wall, and a rear wall having an upper end, means pivoting the rearward ends of the support arms to said side walls, links extending between and pivoted to said lift arms and intermediate portions of the supporting arms, bracket means fixed on the tractor at a level above said supporting arms, link means comprising a forward link having a forward end connected to said bracket means and a rearward end, a rigid strut fixed on the tractor beneath said bracket means, said strut having an upper end connected to said forward link at a point intermediate the ends of said forward link, said link means further comprising a rearward link having a forward end pivoted to the rearward end of the forward link and a rearward end pivoted to the scoop rear wall at a point adjacent to the upper end of the rear wall, the said upper end of the strut being connected to said forward link at a point near to and spaced from the rearward end of said forward link.

References Cited in the file of this patent

UNITED STATES PATENTS

| | | |
|---|---|---|
| 2,352,466 | Arps | June 27, 1944 |
| 2,465,831 | Arps | Mar. 29, 1949 |